United States Patent [19]
Shih et al.

[11] Patent Number: 5,654,785
[45] Date of Patent: Aug. 5, 1997

[54] FOLDABLE, EASILY STORED SUNGLASSES

[76] Inventors: Hung Yu Shih, 104-1 Lunz-Zu-Ten Ming-Hsung, Chiayi, Taiwan; Paul Chen, 2007 Primrose Ave., South Pasadena, Calif. 91030; Jerry Huang, 790 Granada Ave., San Marino, Calif. 91108

[21] Appl. No.: 532,081

[22] Filed: Sep. 22, 1995

[51] Int. Cl.<sup>6</sup> ............... G02C 9/00; G02C 7/10; G02C 7/08
[52] U.S. Cl. ............... 351/47; 351/44; 351/57
[58] Field of Search ............... 351/44, 41, 47, 351/57, 83, 86, 90, 92, 96, 97, 101, 103, 106, 110

[56] References Cited

U.S. PATENT DOCUMENTS 2,608,904  9/1952  Barrington ............... 351/106
3,610,742  10/1971  Page ............... 351/106

FOREIGN PATENT DOCUMENTS 9318429  9/1993  WIPO ............... 351/106

*Primary Examiner*—Hung X. Dang
*Attorney, Agent, or Firm*—Peterson, Wicks, Nemer & Kamrath, P.A.

[57] ABSTRACT

A lens locator positions a pair of lenses. The lens locator has a plurality of buckles and a connector which is made a of titanium-nickel alloy. The buckle has a hook extending from one end of the buckle and a generally U-shaped groove defined by the buckle. The U-shaped groove receives a lens of the sunglasses while folded and the U-shaped groove receives a lens of regular glasses while the sunglasses are in.

4 Claims, 4 Drawing Sheets

FOLDABLE, EASILY STORED SUNGLASSES

BACKGROUND OF THE INVENTION

The invention relates to a pair of sunglasses. More particularly, the invention relates to a pair of sunglasses which is easily stored.

When society becomes more and more civilized, more and more disease related to civilization will occur. For example, myopia is one of them. Myopia occurs in both adults and children. The ratio of myopia is very high. Therefore, eye care is very important, especially in the subtropical region where the weather is hot and ultraviolet ray are intense. These conditions often irritate and damage the eyes. Currently, we use sunglasses to avoid the eyes from being irradiated directly by sunlight. However, for myopia patients, it is very inconvenient to use sunglasses. Therefore, easily stored sunglasses were invented. Using the hooks provided, the sunglasses can be coupled with the frame of regular glasses. However, traditional easily stored sunglasses are damaged easily.

Referring to FIGS. 1 and 2, traditional sunglasses 10 are mainly composed of the lens body 1, a supporting frame 2 and a clip 3.

The lens body 1 has two opposite lenses 11. A connecting rod 12 runs across the two lenses 11.

The supporting frame 2 is made in a single piece. There is a pad 21 in front of the supporting frame 2. The supporting frame 2 is connected to the connecting rod 12 through the pad 21. The clip rod 23 is connected to the bottom of the supporting frame 2. On the back of the supporting frame 2, there is a receiving stand 24 which can receive and connect to the clip 3.

The clip 3 includes a suppressing piece 31, a clip rod 32 and a reversing spring 33. The clip rod 32 appears to be U shape. The suppressing piece 31 is connected to the clip rod 32, and the clip 3 is placed behind the receiving stand 24 of the supporting frame 2. Using the reversing spring 33 to suppress the connecting rod. 12 of the main frame 1, and along with the pad 21 of the supporting frame 2, the lens body is prohibited from spinning. At the same time, the reversing spring 33 can control the opening of the clip rod By using outside force on the suppressing piece 31, and turning the reversing spring 33 through the suppressing piece 31, the reversing spring 33 and the clip rod 32 will curl up toward the outer end. By using the block rod 22 of the supporting frame 2 and by clipping the clip rod 23 of the supporting frame 2 to the front side of the glass lens, and with the force used to clip the clip rod 32 to the inner side of the glass lens, the entire structure of the sunglasses 10 were clipped to the glasses 20 solidly. When doing so, the connecting rod 12 of the lens body 1 is limited to the pad 21 of the supporting frame 2 by the reversing spring 33. When the sunglasses 10 are not used, the lens body 1 cannot be curled up.

The traditional sunglasses have the following drawbacks.

First of all, all myopia patients who have to wear glasses on a long term basis know that a pair of glasses causes a great burden to the nose bridge after a along period of use. Therefore, sponge is often added to the supporting pieces on the glasses which touch the bridge of the nose. The structure of traditional sunglasses is complicated, and therefore makes it heavy. Hence, it increases the burden on the nose bridge even more when using it along with the glasses.

Secondly, the traditional sunglasses can not be easily stored. Moreover, the complicated structure of sunglasses also makes it more difficult to maintain.

Thirdly, the shape of the lens of sunglasses does not usually match with the lens of glasses regular. Therefore, it will not be in harmony with the regular glasses. In addition, after the sunglasses are hooked to the regular glasses, the supporting frame is exposed at the upper portion of the regular glasses which make it very unpleasant.

SUMMARY OF THE INVENTION

The purpose of this invention is to provide a pair of easily stored sunglasses. A flexible titanium-nickel alloy connector will enable the sunglasses to keep its original shape and characteristics after continuous use. The entire structure is light and will not increase the burden on the nose bridge of the user.

Another purpose of this invention is to provide a better structure which is not easily damaged during use. The lens locator is connected to the lens, and each of the multiple lens buckles has a U-shaped groove and an extended hook. This allows for a tougher structure.

Accordingly, a lens locator positions a pair of lenes. The lenses locator has a plurality of buckles and a connector which is made of titanium-nickel alloy. The buckle has a hook extending from one end of the buckle and a generally U-shaped groove defined by the buckle. The U-shaped groove receives a lens of the sunglasses while folded and the U-shaped groove receives a lens of a regular glasses when the sunglasses are in use.

DETAILED DESCRIPTION OF THE INVENTION

Figure 1:
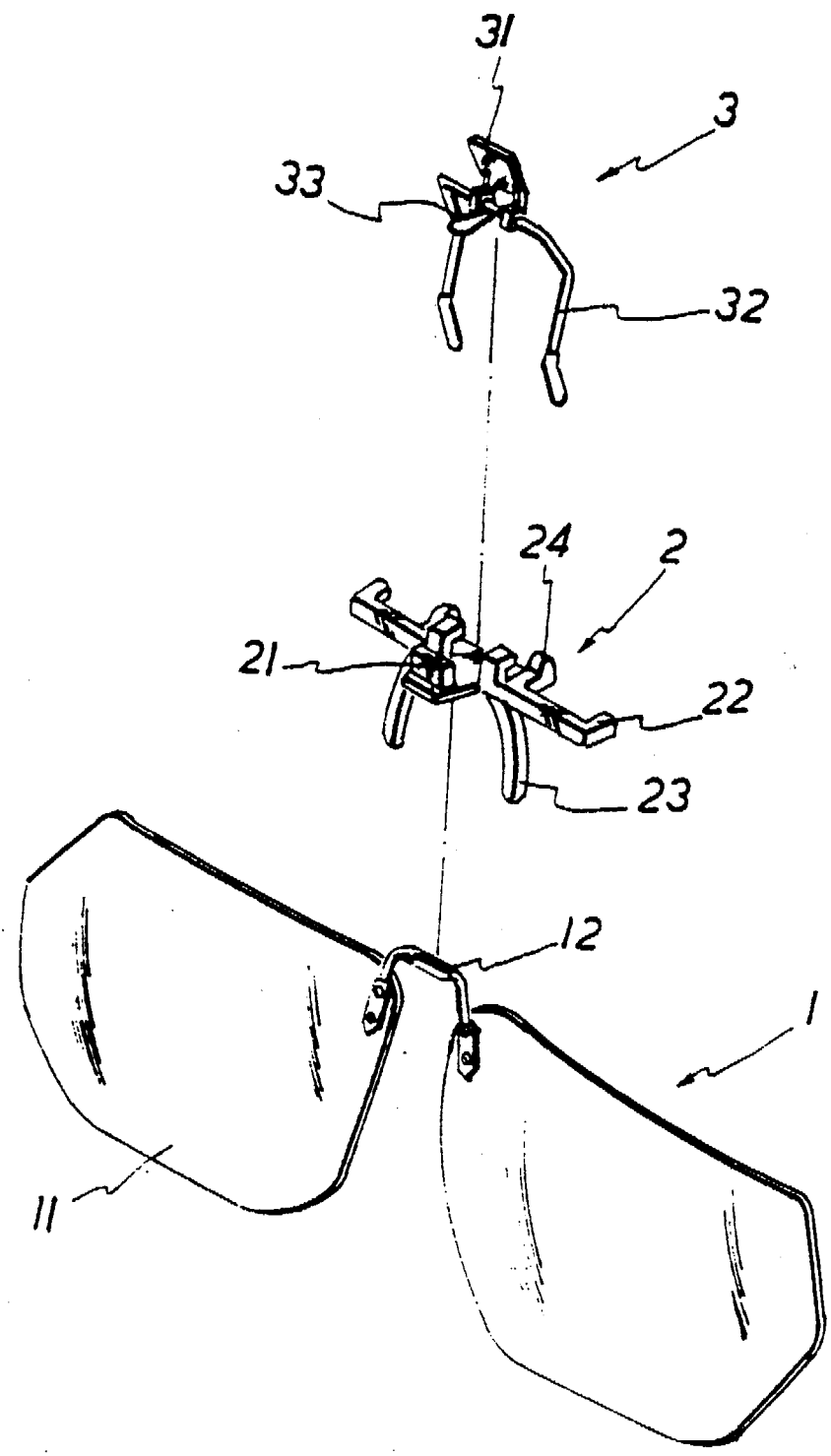
FIG. 1 is a perspective exploded view of a pair of sunglasses of the prior art.
Figure 2:
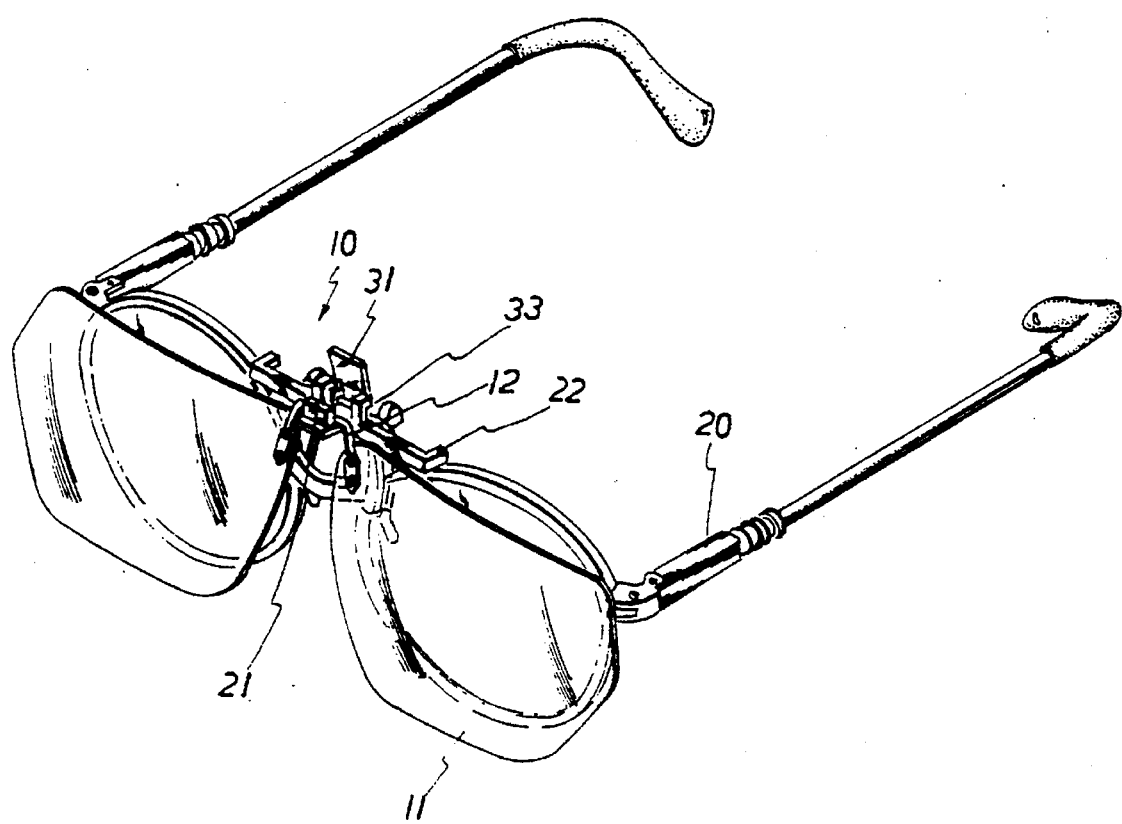
FIG. 2 is a perspective view illustrating the application of traditional sunglasses on a pair of glasses of the prior art.
Figure 3:
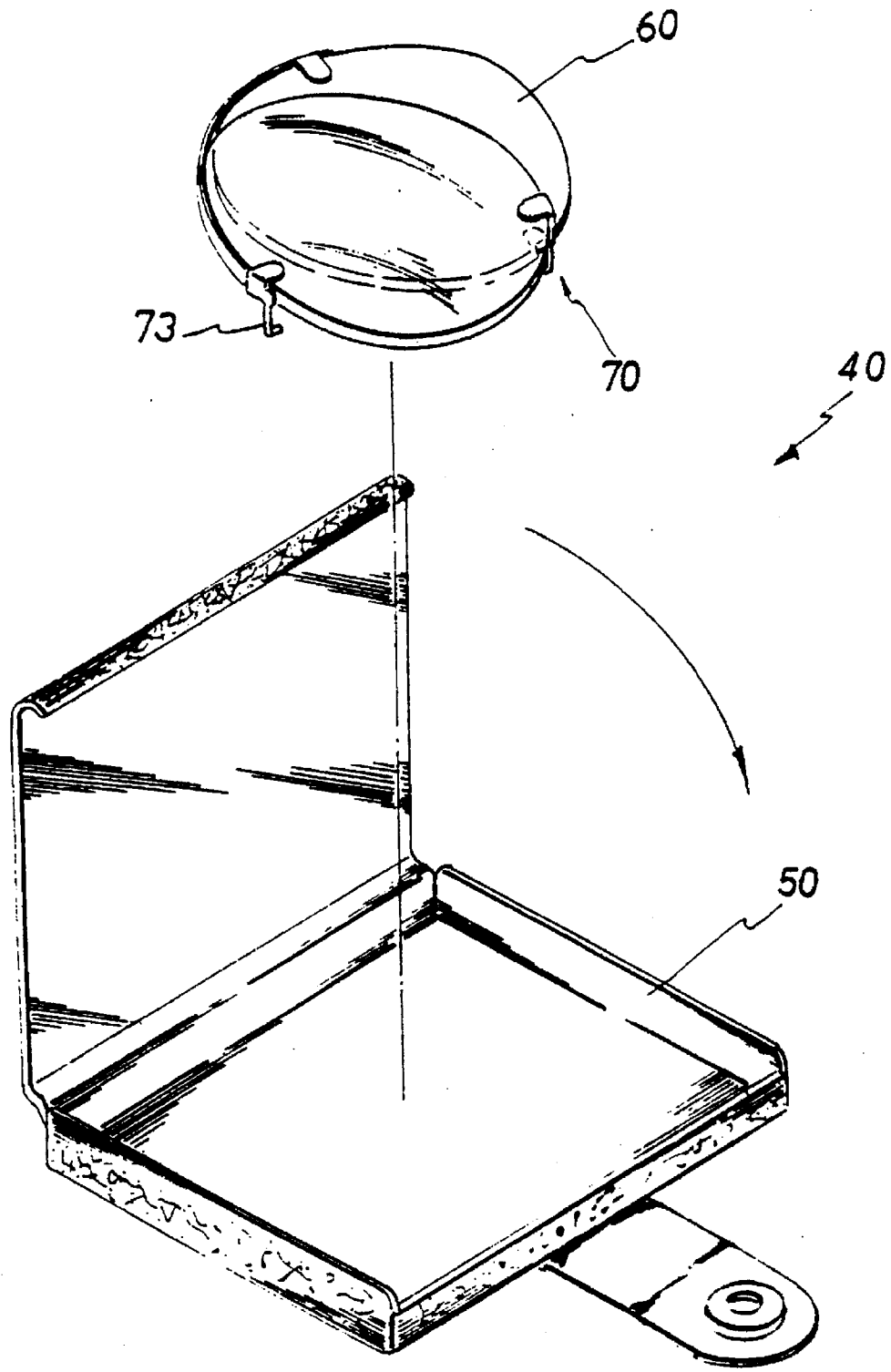
FIG. 3 is a perspective view illustrating a pair of folded sunglasses and a case in accordance with the invention.
Figure 4:
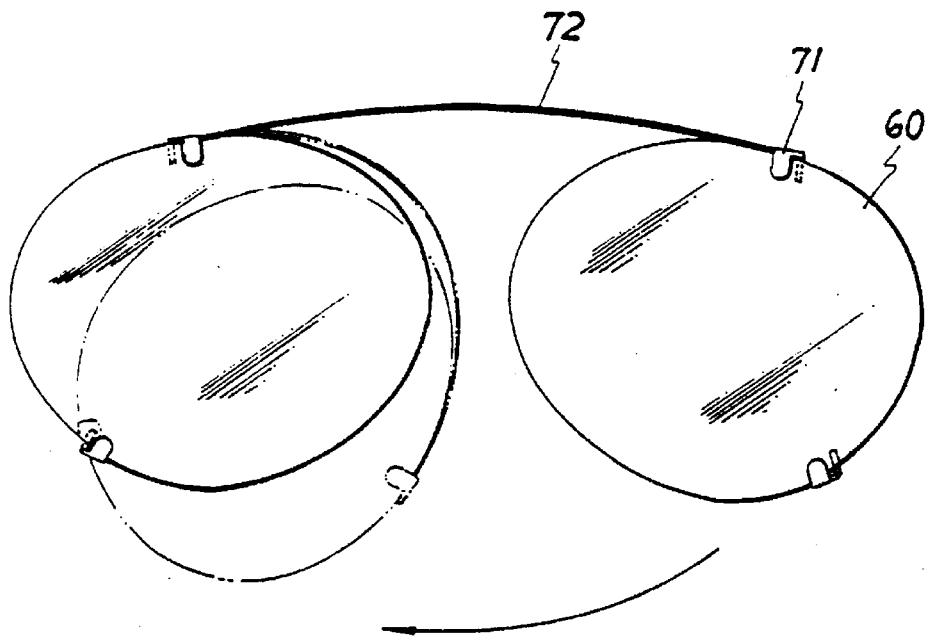
FIG. 4 is a front elevational view of a pair of sunglasses in accordance with the invention.
Figure 5:
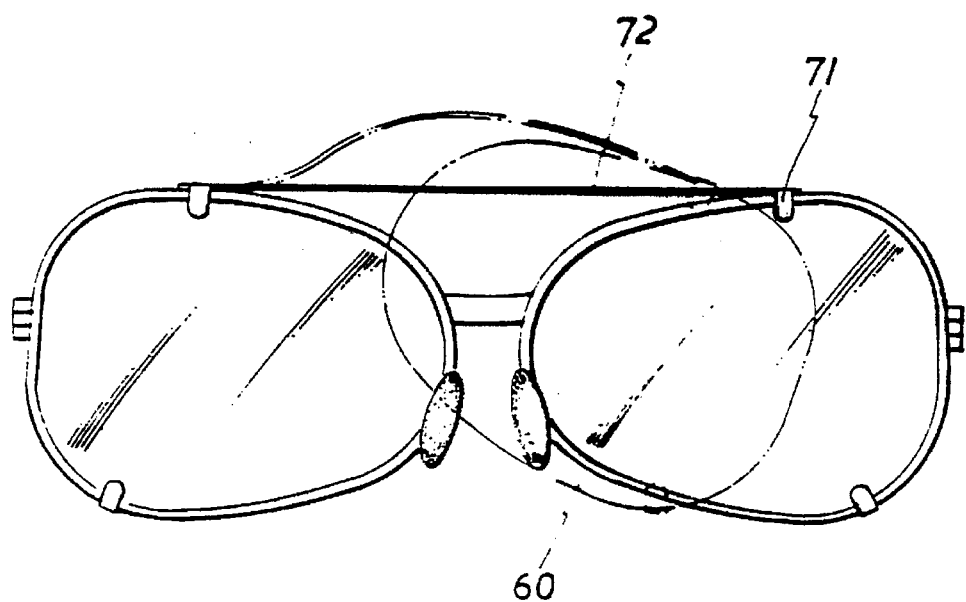
FIG. 5 is a front elevational view illustrating the application of a pair of sunglasses on a pair of glasses.

Referring to FIGS. 3 to 5, this invention relates to an easily stored sunglasses 40. Its primary structure includes a case 50, a pair of lenses 60, and a lens locator 70.

The above components constitute a pair of easily stored sunglasses 40. The lens locator 70 fixes the two lenses 60 in place to form at a proper width, and then to be buckled onto the frame of regular glasses frame. It can be folded and stored separately. The method used to fasten the lens locator 70 and the two lenses 60 is by fastening the buckles 71 to the upper and lower portions of the lens 60. On each end, there is an extended hook 73 which couples with the frame of regular glasses. At the same time, it is welded solidly to the titanium-nickel alloy connector 72 when the buckles 71 are almost connected between the two lenses 60. The connector which is made of titanium-nickel alloy is quite flexible. After bending, it can be restored to its original shape once the outside force is eliminated. In addition, the lens buckle 71 is connected to the lens 60 through the U-shaped groove defined by the buckle 71. A pair of easily stored sunglasses is then completed. Therefore, the U-shaped groove receives a lens of the sunglasses when they are folded and the U-shaped groove receives a lens of a regular glasses when the sunglasses 10 are in use.

When storing the sunglasses in its case 50, the two lenses 60 are piled up against each other. At this time, the connector 72 would be bent and become distorted. Finally, the two lenses would buckle against each other through the lens buckle 71 at the bottom portion of the lens. The folded sunglasses 40 can then be stored in its case 50 directly. When the glasses are taken out of the case 50, the lens buckles 71 which buckle the two lenses against each other can be unbuckled. After they are separated, the connector 72 will be restored to its original shape and then the entire sunglasses can be coupled with the regular glasses once again.

From the previous example, we can learn that this invention has the following characteristics.

First of all, this invention is easy to store because of the special lens locator. The material used is light and will not increase the burden on the nose bridge of the user when it is used together with regular glasses. Moreover, it is convenient to carry.

Secondly, the connector used to connect the two lenses is made of titanium-nickel alloy. It is flexible which allows the easily stored sunglasses to keep its original shape and characteristics after repeated folding and use, and hence increasing the life span of the sunglasses.

Thirdly, the lens locator of the easily stored sunglasses has a plurality of lens buckles. It is constituted of a U-shaped groove and a hook. Whether coupling with the lens or frame, it will not break easily.

The invention is not limited to the above embodiment but various modification thereof may be made. It will be understood by those skilled in the art that various changes in form and detail may be made without departing from the spirit and scope of the invention.

We claim:

1. A pair of foldable, easily stored sunglasses for coupling with regular glasses comprising, in combination: first and second lenses; a plurality of buckles fastened to the lenses, with each buckle having a hook and defining a generally U-shaped groove; and a connector connected between the first and second lenses, with the connector having a use condition with the U-shaped grooves of the buckles receiving the regular glasses to buckle the sunglasses to the regular glasses, with the connector being distortable into a folded condition with the first and second lenses piled up against each other with the U-shaped grooves of the buckles receiving the first and second lenses for buckling the first and second lenses against each other.

2. The pair of sunglasses of claim 1 wherein the connector is flexible and is bent from the use condition to the folded condition.

3. The pair of sunglasses of claim 2 wherein the connector is made of a titanium-nickel alloy.

4. The pair of sunglasses of claim 1 wherein the lenses include upper and lower portions, with buckles being fastened to the upper and lower portions of both of the first and second lenses.

\* \* \* \* \*